United States Patent
Qiu et al.

(10) Patent No.: US 6,721,363 B1
(45) Date of Patent: Apr. 13, 2004

(54) RECEIVER CODEC SUPER SET CONSTELLATION GENERATOR

(75) Inventors: Sigang Qiu, Raleigh, NC (US); Vedavalli Gomatam Krishnan, Raleigh, NC (US); Bo Zhang, Raleigh, NC (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/579,529

(22) Filed: May 26, 2000

Related U.S. Application Data

(60) Provisional application No. 60/140,825, filed on Jun. 28, 1999, and provisional application No. 60/140,705, filed on Jun. 24, 1999.

(51) Int. Cl.[7] .............................. H04B 14/04; H04L 5/16
(52) U.S. Cl. ....................................... 375/242; 375/222
(58) Field of Search ................................. 375/222, 219, 375/241, 242, 261, 340, 316, 265, 254, 285, 346, 295, 296; 370/523

(56) References Cited

U.S. PATENT DOCUMENTS

| | | | | |
|---|---|---|---|---|
| 5,406,583 A | * | 4/1995 | Dagdeviren | 375/216 |
| 5,724,393 A | * | 3/1998 | Dagdeviren | 375/296 |
| 5,751,741 A | | 5/1998 | Voith et al. | 371/37.7 |
| 5,802,111 A | | 9/1998 | Diehl et al. | 375/259 |
| 5,822,371 A | | 10/1998 | Goldstein et al. | 375/242 |
| 5,825,816 A | | 10/1998 | Cole et al. | 375/222 |
| 5,828,695 A | | 10/1998 | Webb | 375/219 |
| 5,831,561 A | * | 11/1998 | Cai et al. | 341/106 |
| 5,838,268 A | | 11/1998 | Frenkel | 341/11 |
| 5,838,724 A | | 11/1998 | Cole et al. | 375/222 |
| 5,844,940 A | | 12/1998 | Goodson et al. | 375/222 |
| 5,844,944 A | | 12/1998 | Betts et al. | 375/298 |
| 5,862,179 A | | 1/1999 | Goldstein et al. | 375/242 |
| 5,862,184 A | | 1/1999 | Goldstein et al. | 375/295 |
| 6,009,121 A | * | 12/1999 | Waldron et al. | 375/254 |
| 6,023,493 A | | 2/2000 | Olafsson | 375/354 |
| 6,034,991 A | * | 3/2000 | Zhou et al. | 375/222 |
| 6,065,030 A | | 5/2000 | Zhang | 708/491 |
| 6,088,334 A | | 7/2000 | Davenport et al. | 370/252 |
| 6,178,200 B1 | * | 1/2001 | Okunev et al. | 375/222 |
| 6,181,737 B1 | | 1/2001 | Okunev et al. | |
| 6,185,249 B1 | * | 2/2001 | Drucker et al. | 375/222 |
| 6,327,301 B1 | | 12/2001 | Demjanenko et al. | |
| 6,381,266 B1 | | 4/2002 | Zhang et al. | |
| 6,480,549 B1 | | 11/2002 | Hirzel et al. | |
| 6,523,233 B1 | | 2/2003 | Wang et al. | |
| 6,542,551 B1 | | 4/2003 | Okunev et al. | |
| 6,549,584 B1 | * | 4/2003 | Gatherer et al. | 375/261 |
| 2002/0085629 A1 | | 7/2002 | Zhang et al. | |

* cited by examiner

Primary Examiner—Tesfaldet Bocure
(74) Attorney, Agent, or Firm—Blakely, Sokoloff, Taylor & Zafman LLP

(57) ABSTRACT

A technique is proposed to accurately estimate the Network CODEC levels for each PCM code a server modem generates. These levels are affected by the digital impairments such as Digital attenuation PAD in the trunk, the Robbed Bit Signaling, the type of CODEC ($\mu$-law or a-law—or non standard), and by analog impairments such as loop distortion, noise, inter-modulation distortion, echo. At client modem equalizer output good estimates for these levels are derived. By detecting RBS pattern of the trunk, and using averages of decode levels of similar RBS slots, more accurate data points are obtained. By further replacing these levels with the closest CODEC receive levels, good accuracy is obtained. Non-monotonic points are detected and eliminated. An upper limit is set for constellation points to avoid saturation of the receiver. IMD correction is applied to the decode levels Ideal points that are not signaled, are added if possible. When PAD-detection or Codec detection fails, PAD is set to 0 dB and the constellation is based on originally received and averaged data points. Techniques are presented for V.90 type modem constellation generation.

26 Claims, 4 Drawing Sheets

RECEIVER CODEC SUPER SET CONSTELLATION GENERATOR

CROSS-REFERENCE TO RELATED APPLICATIONS

The present application claims priority from Provisional U.S. Patent Application Serial No. 60/140,705 filed Jun. 24, 1999 and Provisional U.S. Patent Application Serial No. 60/140,825 filed on Jun. 28, 1999.

Ser. No. 09/592,539 filed Jun. 12, 2000 entitled "Digital Impairment Learning Sequence", now issued as U.S. Pat. No. 6,301,296 on Oct. 9, 2001;

FIELD OF THE INVENTION

The present invention relates generally to an improved technique for generating a super set pulse amplitude modulated (PAM) constellation for a computer modem. In particular, the present invention is directed to accommodating Robbed-Bit Signaling (RBS), programmed attenuation (PAD), and Inter-Modulation Distortion (IMD) during a Digital Impairment Sequence (DIL) conducted with V.90 modems or the like.

BACKGROUND OF THE INVENTION

The V.90 modem is also known as the 56K modem, which, due to power limitations imposed by the FCC is presently limited to 53 Kbits/second transmission rate. FIG. 4 is a simplified block diagram illustrating how a V.90 modem 530 may be connected to a server 510 through a codec 520. V.90 modem 530 is an analog modem communicating with a telephone company (telco) codec (coder/decoder) 520 through a local dial-up line or local loop 540.

As may be appreciated by one of ordinary skill in the art, such a local loop 540 may contain analog impairments characterized as "loop loss". V.90 modem 530 may be provided with an equalizer to offset some of this loop loss. Data transmitted from V.90 modem 530 to codec 520 may be in one of a number of formats depending upon the type of codec.

For example, a so-called $\mu$-law codec may receive data in a 13-bit format (as illustrated in FIG. 4). A so-called A-law codec may receive data in a 12-bit format. Other, so-called "non-conforming" codecs may receive data in yet other formats. Regardless of which format the data is received in, codec 520 converts data received from V.90 modem 530 into digital form (typically 8 bits) for transmission over a telco digital trunk line 550 to server 510.

Digital trunk line 550 may itself contain so-called "digital" impairments, including robbed bit signaling (RBS), digital pad (PAD) and inter-modulation distortion (IMD). Most of these digital impairments are due to design considerations implemented in the telco digital network when it was largely used as a voice-only network. However, such impairments present problems in transmitting digital data over such a network.

The V.90 standard adds to and inherited advantageous features of pre-V.90 56K modems (e.g., X2 modem and Kflex modem). One important feature of the V.90 modem is performance optimization. Using Digital Impairment Learning sequence (DIL) data, the client modem is capable of generating optimal constellations to achieve best throughput for given conditions.

V.90 constellations rely closely on DIL data points. Thus, accuracy of DIL data is one key for accurate constellation generation. One big problem of the prior art is how to obtain highly accurate and optimal DIL data points. V.90 modem 530 must receive a training signal (the Digital Impairment Learning signal, or DIL) and be able to distinguish analog impairments from digital impairments ("de-noising" data) in order to properly characterize the data channel and generate accurate and optimal data constellations.

SUMMARY OF THE INVENTION

In the present invention, several techniques are proposed to is de-noise DIL data and to achieve accurate DIL data, including a linear-to-Ucode conversion algorithm, PAD/RBS pattern detection, DIL de-noising processing, and a ½-RBS de-noising process.

By detecting the non-RBS pattern (e.g., no RBS is present), the DIL data points of the non-RBS slots are averaged to increase accuracy of the received DIL data. Similarly, using averages of DIL data with the same RBS-pattern slots, more accurate DIL data points are obtained. Accurate DIL points provide a key for optimal data throughput performances of the modem.

Received linear DIL data points are equalizer outputs and may be rough and noisy. By the linear-to-Ucode conversion, the DIL rough data may be converted to Ucode indices. The Ucode indicies may be matched to the closest G.711 ($\mu$-law or a-law) values. This process serves to de-noise the DIL data.

The ½-RBS slot refers to D4 channel bank CODECs specified in AT&T Technical Reference, PUB 43801, November 1982, that output close to mid-values of its normal outputs in the RBS slots. In here the codec transfer characteristic changes to span the entire dynamic range using 7 bits during RBS slot. Present invention matches for the ideal values specified for this type CODEC in the ½-RBS slot. This is noted as ½-RBS de-noising.

The present invention may also detect and eliminate DIL data points which are too noisy and/or non-monotonic. In addition, an upper limit may be set for constellation points to avoid saturation of the receiver, by applying PAD and IMD correction. Ideal DIL data points may be added for typical 0 dB, 3 dB and 6 dB PAD to help create optimal constellation tables and thus optimal modem connections. If PAD-detection has failed, the PAD may be set to 0 dB and the constellation based on originally received DIL data points.

DETAILED DESCRIPTION OF THE INVENTION

Figure 4:
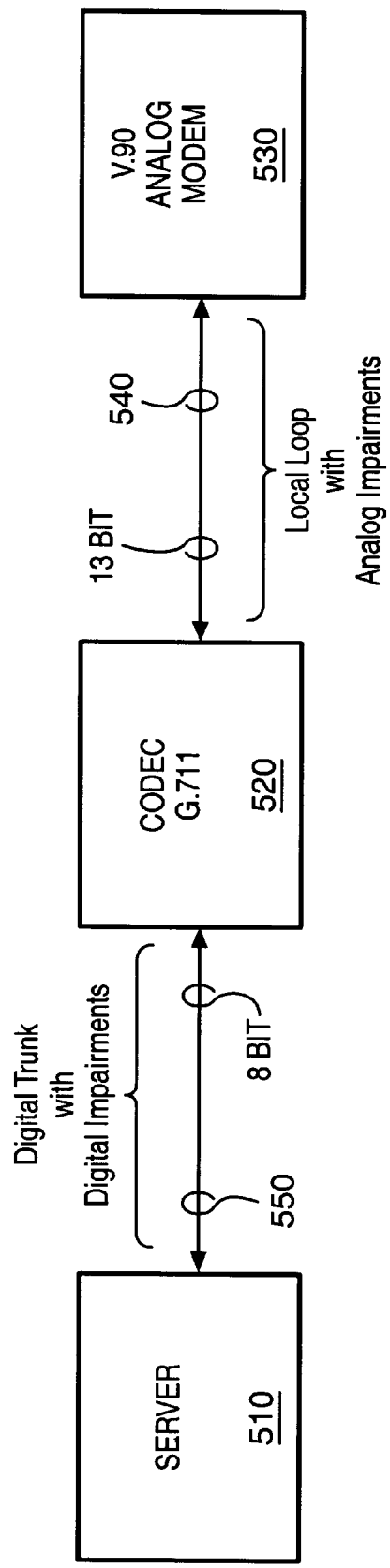
FIG. 4 is a simplified block diagram illustrating how a V.90 modem may be connected to a server through a codec.

Referring now to FIG. 4, server 510 modem transmits a DIL sequence which is made out of PCM (Pulse Code Modulation) codes (numbers ranging from −128 to 127) as specified in the DIL descriptor. Passing digital trunk with digital impairments 550, the DIL sequence becomes modified by digital impairments such as PAD gain, RBS, Codec type. At the output of Codec 520, the received linear values are further impaired in local loop with analog impairments 540 by analog impairments of noise, non-linearity, echo and loop characteristics.

Thus, the received equalizer outputs of client modem 530 corresponds to Codec receive levels corrupted by the non-cancelable impairments. In the present invention, by using the calculated PAD gain, a linear-to-Ucode conversion algorithm and a hard slice-algorithm, noisy receive levels may be correlated to ideal Codec levels. This technique of correlating noisy received DIL levels to ideal DIL levels is referred to as the de-noising process.

RBS Detection

RBS (robbed-bit signaling) is a signaling method used by digital networks to transmit data between digital equipment on a telephone network. RBS uses the LSB (least-significant bit) of the same slot in each data frame to send data between components of a telephone system. During the digital connection, this RBS bit may be set to 1, 0, or toggled between 1 and 0. Therefore, the digital network may change one of every six symbols to a different value from the one sent originally. In each data frame, the slot used for RES is called the RBS slot (otherwise, it is the no-RBS slot).

Comparing to the pre-V.90 standard modem (X2 and Kflex), one of the big advantages of V.90 modem is it is capable of achieving optimal performance based on individual loops. The DIL descriptor asks digital modem 510 to send desired Ucode sequence, which, when received by analog modem 530, is used to create the receiver code super constellations. The so-called DIL points are averages of number of linear equalizer outputs corresponding to the same Ucode in the same slot. The accuracy of the received DIL points is one key for V.90 performance. The received linear values may be matched to the closest decoded linear values, using the linear-to-PCM-conversion algorithm. For this reason, it may be necessary to first perform RBS detection.

For example, suppose there are two non-RBS symbol slots. For those slots, the two sets of DIL points may be averaged to get more accurate data. If RBS is not present (and that fact can be detected) more accurate constellations may thus be created and V.90 performance is improved. In general, if RBS-pattern slots are detected, the means of these DIL points are more accurate to use. This leads to optimal V.90 modem performance.

RBS detection is disclosed in-more detail in Provisional U.S. Patent Application Serial No. 60/140,705 filed Jun. 24, 1999 and copending U.S. patent application Ser. No. 09/598,680 entitled "Inter-Modulation Distortion Detection" also claiming priority from Provisional U.S. Patent Application Serial No. 60/140,075.

Figure 1:
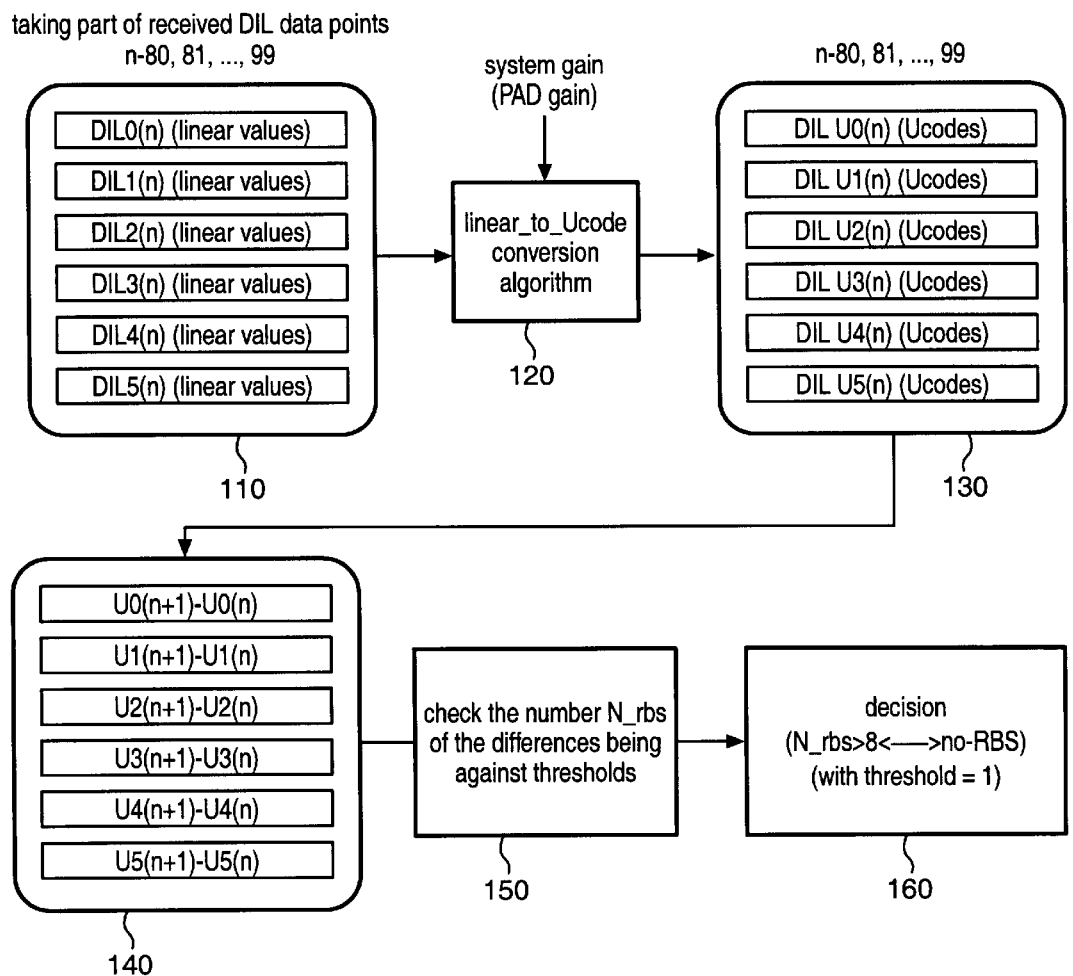
FIG. 1 is a block diagram illustrating how a non-RBS slot is detected.

A similar RBS detection method is described here. In the V.90 modem, a data frame may comprise six slots. Each slot corresponds to one set of DIL points. FIG. 1 is a block diagram illustrating how a non-RBS slot is detected. Twenty of the DIL data points (e.g., from 80 to 99) for each slot may be used for RBS detection as illustrated in step 110. These twenty points are selected as they are considered to be stable and reliable points under most conditions.

The threshold illustrated in FIG. 1 for non-RBS detection may be set to 1. Example 1 discussed below illustrates the procedures for RBS-pattern detection. In practice, only a few DIL data points (numbered from 80 to 99) may be used for RBS-pattern identification as illustrated in step 110 of FIG. 1.

In step 120, the linear to U-code conversion takes place. The linear to U-code conversion algorithm is described below in connection with Example 1. The system PAD gain may be input in step 120 as a variable in the linear to U-code conversion.

Pad gain may be detected by any one of a number of techniques, including the technique disclosed in Provisional U.S. Patent Application Serial No. 60/140,705 filed Jun. 24, 1999 incorporated herein by reference and in co-pending U.S. patent application Ser. No. 09/598,934 entitled "Pad Detection", also claiming priority from Provisional U.S. Patent Application Serial No. 60/140,705. Digital PAD is one kind of digital power loss measured in dB.

There are a limited number of known digital PADs, (e.g. 0 dB, 3 dB, 3.5 dB, 6db and 8 dB). Once the amount of digital PAD is known, several typical constellation points may be pre-calculated independently of RBS. Then digital loop (PAD information) may be determined, using a matching pursuit method. A similar but different approach is disclosed in proposed in application Ser. No. 09/598,934 entitled "Pad Detection".

In step 130, the u-code values for the twenty selected levels of the six slots are stored. In step 140, Ucode values for a given index (n) are subtracted from subtracted from Ucode values for an adjacent index (n+1). The resultant set of values N_rbs is checked against a predetermined threshold value, in this case set to one. In step 160, if number of difference values greater than one (N_rbs) is greater than a decision value (e.g., 8) then a no-RBS decision is made (e.g., this slot has no RBS).

DIL De-noising

Figure 2:
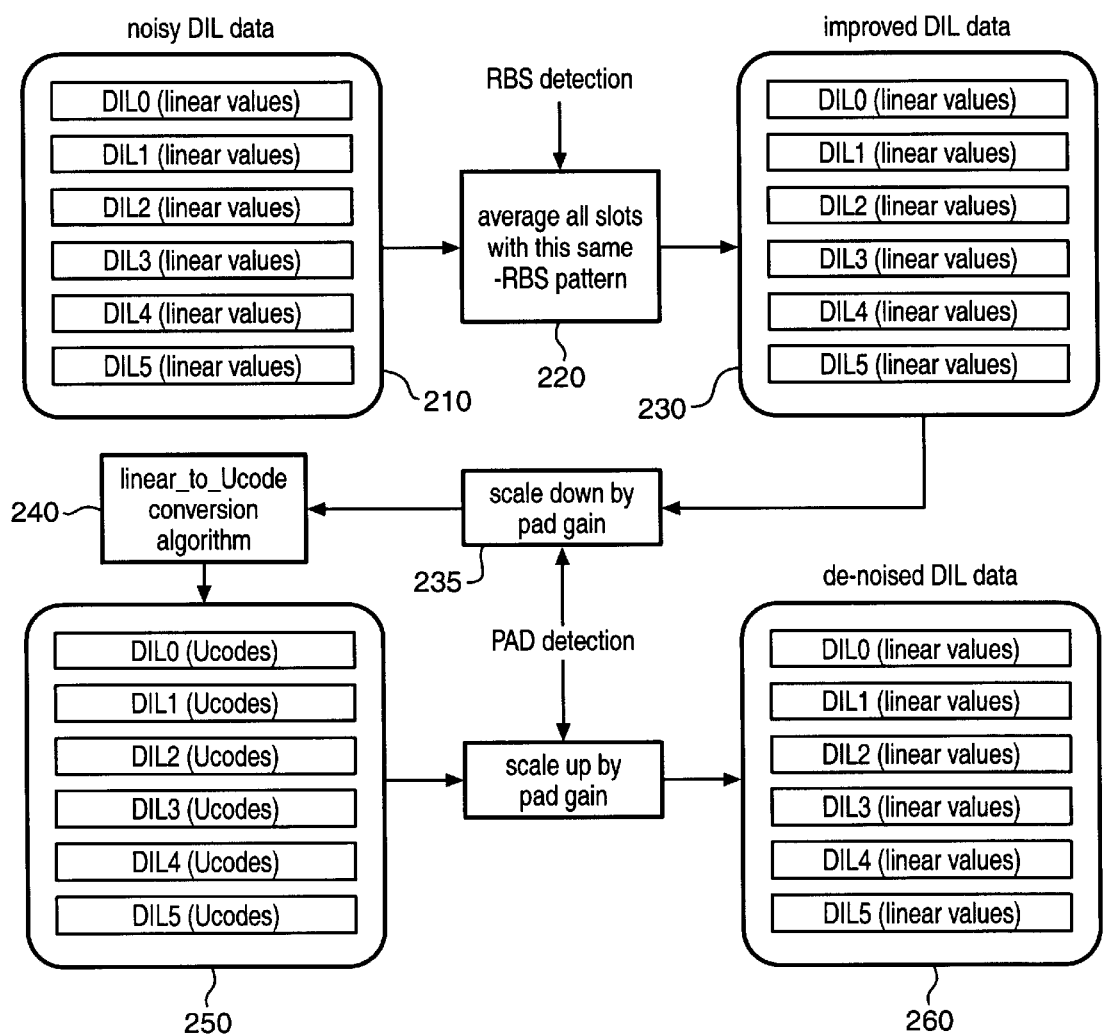
FIG. 2 is a flowchart illustrating the steps in the DIL de-noising process.

FIG. 2 is a flowchart illustrating the steps in the DIL de-noising process. The values transmitted by the digital modem may be selected from 128 points (e.g., the G.711 points). The received linear values may comprise noisy G.711 points as illustrated in step 210 of FIG. 2.

In step 220 DIL points in the slots with the same RBS pattern are averaged. The improved DIL data is then stored in step 230.

The digital PAD attenuation is compensated by scaling down the DIL data by pad gain in step 235. The improved DIL data may then be matched to the closest G.711 points (the decoder linear values), by first using the linear-to-Ucode conversion algorithm (described below) in step 240 to produce Ucode DIL values in step 250. The Ucode DIL values in step 250 are then matched to their closest standard G.711 points. Finally, de-noised DIL data is obtained in step 260 by converting the standard G.711 Ucode values back to linear values, after being scaled up by the pad gain in step 255.

Since the linear to Ucode conversion process converts linear values to their nearest corresponding Ucode value, the Ucode to linear conversion in step 260 does not simply yield back the noisy linear data of steps 210 or 230. When converted back to linear values, the Ucode data of step 250 is converted back to a standard linear value, not a noisy linear value.

By this algorithm, the DIL linear equalizer outputs are converted to PCM Ucode indices. They then may be matched to the closed G.711 ($\mu$ or A-law) values. This is a de-noising processing, which increases the accuracy of the DIL data. The mathematical formula for the linear-to-Ucode conversion (for $\mu$-law only) is formulated as follows (It is similar for A-Law).

The following formulas illustrate how linear-to-Ucode conversion algorithm works. A linear positive value x describes the input value. Such linear values represent signal level (voltage) in scaled units from 0 to 32124 (7D7C hex) as determined by ITU standard G.711. The output of the algorithm is described by U-code y. For the μ-law case the conversion is calculated as follows.

First, set x=min (x, 32124). That is to say, let x be the minimum value of either x or 32124. If x is greater than 32124, redefine x to equal 32124. Next, calculate f and the smallest e to satisfy the equation $2^e \cdot f = x+132$, where to $0 \leq f < 32$. Finally, calculate y as $y=16 \cdot e + \lfloor f \rfloor - 64$, where $\lfloor f \rfloor$ is the integer part of f. The notation $\lfloor f \rfloor$ indicates "floor" or the absolute integer value of f (any decimal portion is truncated). For the A-law case, a similar algorithm is used. First, set x=x+256 if x is less than 256. Next, we set x=min (x, 32256). That is to say, let x be the minimum value of either x or 32256. If x is greater than 32256, redefine x to equal 32256. Next, calculate f and the smallest e to satisfy the equation $2^e \cdot f = x$, where to $0 \leq f < 32$. Finally, calculate y as $y=16 \cdot e + \lfloor f \rfloor - 64$, where $\lfloor f \rfloor$ is the integer part of f. The notation $\lfloor f \rfloor$ indicates "floor" or the absolute integer value of f (any decimal portion is truncated).

½-RBS DIL Data De-noising

½ RBS detection is disclosed in more detail in Provisional U.S. Patent Application Serial No. 60/140,705 file Jun. 24, 1999 and in co-pending U.S. patent application Ser. No. 09/598,934 entitled "Pad Detection", also claiming priority from Provisional U.S. Patent Application Serial No. 60/140,705.

Figure 3:
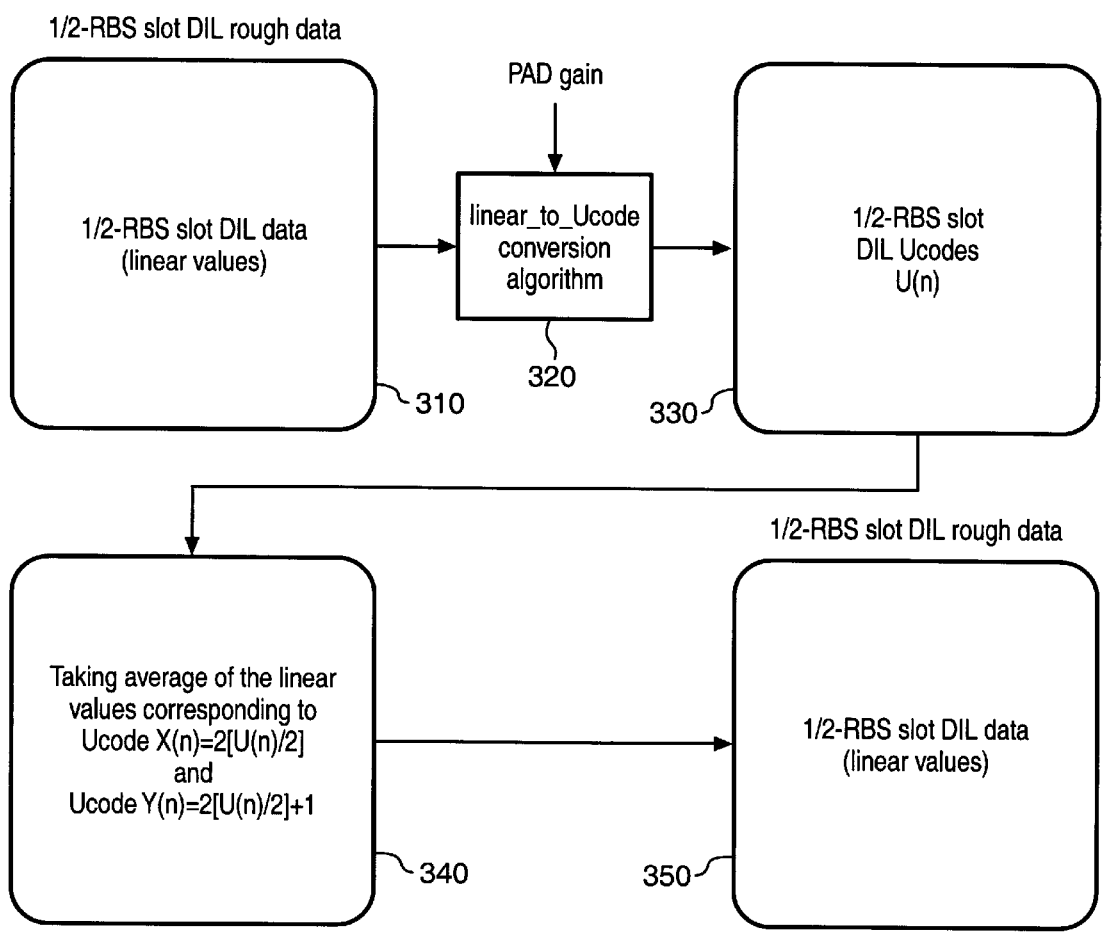
FIG. 3 is a flow chart illustrating the steps in the DIL de-noising process for ½-RBS slot.

FIG. 3 illustrates the DIL de-noising process for ½-RBS slot. In step 310, ½-RBS slot DIL data is received as linear values. Using the calculated PAD gain and the linear to Ucode algorithm of the present invention, the ½-RBS DIL linear data is converted to Ucodes U(n) in step 320 and stored in step 330. In step average of the linear values corresponding to the two G.711 points X(n) and Y(n) closest to the received linear values. This averaged value becomes the ½-RBS slot DIL data in step 350.

Eliminating Points Which are Non-monotonic

Because of the noisy channel, noisy data may be obtained. In a case where a received data point is far away from the idea G.711 points, the received data point may be eliminated. The criterion is comparing the difference of received data and the ideal point against the quarter of the minimal DIL-segment distance.

IMD correction may be first applied if needed to de-noise the decode levels. Next, ideal points corresponding to the holes in the DIL sequence are added in case the channel is very clean and the pad and codec are one of the standard ones (0 dB, 3 dB, 6 dB, A-law) so as to increase the data rate possibilities and V.90, modem throughput.

In case of pad-detection failure, the raw decode levels may be used as those in RBS slots and averaged raw decode levels in non-RBS slots for the receive decode levels and pad gain may be set to 0 dB so as not to violate the regulatory transmit power restriction of the server.

Next, the upper constellation point may be limited, based on IMD and based on the PAD to avoid saturation of the receiver. For example, if digital PAD loss is too high (PAD=8 dB or above), the constellation points may be limited up to index 112.

EXAMPLE 1

Linear to PCM Code Conversion

This example illustrates how DIL data is processed. The purpose here is to increase the accuracy of received DIL data such that the modem performance may be optimized. The data in Example 1 was generated from actual telephone line conditions in Fremont, Calif. line connecting to the U.S. Robotics™ BBS server.

In Example 1 a pad gain of 323 Bh (12859 decimal) was previously determined using the techniques set forth U.S. Provisional Patent Application Serial No. 60/140,705 file Jun. 24, 1999. Pad gain is first converted to a decimal value, where a pad gain of 7 FFF (32767 decimal) is equated to a pad value of 1.0. Thus, pad gain in this instance=12859/32767=0.3924.

Table 1 illustrates DIL Linear Values for each of the six slots DIL0 through DIL5, along with numbered index of the level number. Table 2 illustrates the CODEC U-CODE Indices for the same data.

Applying the linear-to-Ucode conversion formulas discussed above, the relationship between Table 2 and Table 3 can be illustrated. For example, in slot DIL0, index 16, a first linear value x of 144 appears. Multiplying the value by our pad gain of 0.3924, we obtain a padded value of 55.7. For a μ-Law conversion, we first, set x=min(x, 32124). In this instance, x is much less than 32124, and thus our x value remains 55.7.

Next, we calculate f and the smallest e to satisfy the equation $2^e \cdot f = x+132$, where to $0 \leq f < 32$. In this instance, since x=55.7, the equation reduces to:

$$2^e \cdot f = 55.7 + 132, \text{ where to } 0 \leq f < 32, \text{ or}$$

$$2^e \cdot f = 187.72, \text{ where to } 0 \leq f < 32, \text{ or}$$

$$f = 187.72/2^e, \text{ where } 0 \leq f < 32, \text{ or}$$

$$f = 23.46 \text{ and } e = 3.$$

Finally, we calculate UCODE y as $y=16 \cdot e + \emptyset f \rfloor$, where $\lfloor f \rfloor$ is the integer part of f. Plugging in the f and e values calculated above, we yield:

$$y = 16 \cdot e + \lfloor f \rfloor - 64, \text{ or}$$

$$y = 16 \cdot 3 + \lfloor 123.46 \rfloor - 64, \text{ or}$$

$$y = 16 \cdot 3 + 23 - 64 = 7$$

The remaining UCODE values in Table 2 are calculated in a similar manner.

TABLE 1

| RECEIVED DIL LINEAR VALUES | | | | | | |
|---|---|---|---|---|---|---|
| DIL0 | DIL1 | DIL2 | DIL3 | DIL4 | DIL5 | INDEX |
| 0 | 0 | 0 | 0 | 0 | 0 | 0 |
| 0 | 0 | 0 | 0 | 0 | 0 | 1 |
| 0 | 0 | 0 | 0 | 0 | 0 | 2 |
| 0 | 0 | 0 | 0 | 0 | 0 | 3 |
| 0 | 0 | 0 | 0 | 0 | 0 | 4 |
| 0 | 0 | 0 | 0 | 0 | 0 | 5 |
| 0 | 0 | 0 | 0 | 0 | 0 | 6 |
| 0 | 0 | 0 | 0 | 0 | 0 | 7 |
| 0 | 0 | 0 | 0 | 0 | 0 | 8 |
| 0 | 0 | 0 | 0 | 0 | 0 | 9 |
| 0 | 0 | 0 | 0 | 0 | 0 | 10 |
| 0 | 0 | 0 | 0 | 0 | 0 | 11 |
| 0 | 0 | 0 | 0 | 0 | 0 | 12 |
| 0 | 0 | 0 | 0 | 0 | 0 | 13 |
| 0 | 0 | 0 | 0 | 0 | 0 | 14 |
| 0 | 0 | 0 | 0 | 0 | 0 | 15 |
| 144 | 147 | 143 | 145 | 145 | 142 | 16 |
| 0 | 0 | 0 | 0 | 0 | 0 | 17 |

TABLE 1-continued

RECEIVED DIL LINEAR VALUES

| DIL0 | DIL1 | DIL2 | DIL3 | DIL4 | DIL5 | INDEX |
|---|---|---|---|---|---|---|
| 0 | 0 | 0 | 0 | 0 | 0 | 18 |
| 0 | 0 | 0 | 0 | 0 | 0 | 19 |
| 205 | 206 | 204 | 207 | 205 | 203 | 20 |
| 0 | 0 | 0 | 0 | 0 | 0 | 21 |
| 0 | 0 | 0 | 0 | 0 | 0 | 22 |
| 0 | 0 | 0 | 0 | 0 | 0 | 23 |
| 265 | 265 | 265 | 267 | 266 | 264 | 24 |
| 0 | 0 | 0 | 0 | 0 | 0 | 25 |
| 0 | 0 | 0 | 0 | 0 | 0 | 26 |
| 0 | 0 | 0 | 0 | 0 | 0 | 27 |
| 337 | 337 | 336 | 338 | 334 | 332 | 28 |
| 0 | 0 | 0 | 0 | 0 | 0 | 29 |
| 0 | 0 | 0 | 0 | 0 | 0 | 30 |
| 0 | 0 | 0 | 0 | 0 | 0 | 31 |
| 417 | 420 | 415 | 421 | 418 | 417 | 32 |
| 0 | 0 | 0 | 0 | 0 | 0 | 33 |
| 456 | 458 | 456 | 461 | 457 | 455 | 34 |
| 0 | 0 | 0 | 0 | 0 | 0 | 35 |
| 539 | 539 | 534 | 540 | 541 | 537 | 36 |
| 0 | 0 | 0 | 0 | 0 | 0 | 37 |
| 578 | 576 | 576 | 578 | 579 | 574 | 38 |
| 0 | 0 | 0 | 0 | 0 | 0 | 39 |
| 658 | 661 | 656 | 657 | 660 | 657 | 40 |
| 0 | 0 | 0 | 0 | 0 | 0 | 41 |
| 738 | 739 | 734 | 739 | 741 | 739 | 42 |
| 0 | 0 | 0 | 0 | 0 | 0 | 43 |
| 779 | 781 | 778 | 784 | 779 | 779 | 44 |
| 0 | 0 | 0 | 0 | 0 | 0 | 45 |
| 856 | 861 | 857 | 863 | 859 | 861 | 46 |
| 0 | 0 | 0 | 0 | 0 | 0 | 47 |
| 940 | 940 | 938 | 946 | 940 | 940 | 48 |
| 997 | 940 | 934 | 1004 | 1003 | 929 | 49 |
| 1088 | 1085 | 1085 | 1084 | 1087 | 1081 | 50 |
| 1169 | 1084 | 1086 | 1170 | 1168 | 1080 | 51 |
| 1172 | 1168 | 1162 | 1170 | 1174 | 1165 | 52 |
| 1253 | 1166 | 1167 | 1250 | 1247 | 1164 | 53 |
| 1335 | 1331 | 1332 | 1334 | 1330 | 1331 | 54 |
| 1418 | 1329 | 1324 | 1408 | 1413 | 1325 | 55 |
| 1411 | 1410 | 1408 | 1414 | 1410 | 1405 | 56 |
| 1493 | 1414 | 1409 | 1495 | 1495 | 1404 | 57 |
| 1573 | 1577 | 1576 | 1577 | 1577 | 1569 | 58 |
| 1656 | 1571 | 1572 | 1655 | 1651 | 1571 | 59 |
| 1736 | 1739 | 1732 | 1740 | 1736 | 1733 | 60 |
| 1736 | 1737 | 1732 | 1743 | 1732 | 1734 | 61 |
| 1819 | 1819 | 1812 | 1815 | 1816 | 1814 | 62 |
| 1899 | 1819 | 1816 | 1904 | 1896 | 1813 | 63 |
| 1981 | 1983 | 1981 | 1978 | 1980 | 1983 | 64 |
| 2138 | 1985 | 1981 | 2144 | 2134 | 1980 | 65 |
| 2215 | 2223 | 2222 | 2227 | 2215 | 2220 | 66 |
| 2351 | 2223 | 2224 | 2354 | 2346 | 2219 | 67 |
| 2524 | 2512 | 2505 | 2512 | 2518 | 2513 | 68 |
| 2683 | 2520 | 2514 | 2674 | 2675 | 2511 | 69 |
| 2844 | 2847 | 2840 | 2841 | 2835 | 2839 | 70 |
| 2839 | 2843 | 2847 | 2850 | 2836 | 2838 | 71 |
| 3010 | 3014 | 3004 | 3008 | 2996 | 3007 | 72 |
| 3176 | 3011 | 3000 | 3172 | 3167 | 3006 | 73 |
| 3334 | 3338 | 3333 | 3336 | 3329 | 3329 | 74 |
| 3508 | 3341 | 3315 | 3496 | 3497 | 3328 | 75 |
| 3497 | 3499 | 3492 | 3497 | 3487 | 3499 | 76 |
| 3658 | 3498 | 3492 | 3650 | 3654 | 3487 | 77 |
| 3821 | 3825 | 3819 | 3824 | 3809 | 3816 | 78 |
| 3984 | 3823 | 3817 | 3985 | 3976 | 3813 | 79 |
| 4141 | 4152 | 4136 | 4151 | 4139 | 4141 | 80 |
| 4469 | 4144 | 4134 | 4462 | 4462 | 4134 | 81 |
| 4631 | 4634 | 4622 | 4634 | 4619 | 4629 | 82 |
| 5046 | 4638 | 4623 | 5045 | 5037 | 4612 | 83 |
| 5053 | 5055 | 5046 | 5054 | 5036 | 5041 | 84 |
| 5385 | 5045 | 5039 | 5375 | 5371 | 5040 | 85 |
| 5701 | 5705 | 5700 | 5704 | 5687 | 5695 | 86 |
| 6029 | 5710 | 5697 | 6034 | 6018 | 5699 | 87 |
| 6363 | 6366 | 6351 | 6363 | 6344 | 6347 | 88 |
| 6369 | 6363 | 6350 | 6355 | 6351 | 6348 | 89 |
| 6684 | 6692 | 6674 | 6687 | 6671 | 6675 | 90 |
| 7017 | 6689 | 6675 | 7007 | 6992 | 6671 | 91 |
| 7341 | 7349 | 7326 | 7342 | 7323 | 7328 | 92 |

TABLE 1-continued

RECEIVED DIL LINEAR VALUES

| DIL0 | DIL1 | DIL2 | DIL3 | DIL4 | DIL5 | INDEX |
|---|---|---|---|---|---|---|
| 7661 | 7339 | 7325 | 7661 | 7644 | 7316 | 93 |
| 7665 | 7666 | 7646 | 7660 | 7651 | 7643 | 94 |
| 7991 | 7675 | 7654 | 7988 | 7964 | 7650 | 95 |
| 8313 | 8316 | 8276 | 8306 | 8274 | 8301 | 96 |
| 8960 | 8331 | 8273 | 8960 | 8922 | 8317 | 97 |
| 9606 | 9602 | 9582 | 9607 | 9563 | 9603 | 98 |
| 9936 | 9605 | 9570 | 9923 | 9884 | 9608 | 99 |
| 10442 | 10440 | 10397 | 10444 | 10412 | 10441 | 100 |
| 11108 | 10456 | 10393 | 11086 | 11048 | 10437 | 101 |
| 11746 | 11734 | 11717 | 11748 | 11722 | 11761 | 102 |
| 12421 | 11751 | 11719 | 12406 | 12361 | 11764 | 103 |
| 12386 | 12389 | 12368 | 12396 | 12370 | 12421 | 104 |
| 13061 | 12390 | 12361 | 13050 | 13020 | 12395 | 105 |
| 13719 | 13711 | 13672 | 13726 | 13662 | 13728 | 106 |
| 14367 | 13713 | 13678 | 14348 | 14315 | 13733 | 107 |
| 15006 | 15004 | 14967 | 15021 | 14975 | 15036 | 108 |
| 15030 | 15008 | 14961 | 15003 | 14974 | 15029 | 109 |
| 15667 | 15655 | 15615 | 15647 | 15616 | 15687 | 110 |
| 16315 | 15661 | 15628 | 16291 | 16267 | 15676 | 111 |
| 16977 | 16906 | 16949 | 17010 | 16952 | 16932 | 112 |
| 18264 | 16880 | 16999 | 18360 | 18228 | 16952 | 113 |
| 18905 | 18900 | 18938 | 18958 | 18909 | 18890 | 114 |
| 20250 | 18870 | 18936 | 20260 | 20180 | 18906 | 115 |
| 21260 | 21164 | 21232 | 21292 | 21210 | 21187 | 116 |
| 22567 | 21130 | 21221 | 22630 | 22542 | 21152 | 117 |
| 23847 | 23733 | 23839 | 23956 | 23864 | 23815 | 118 |
| 23893 | 23807 | 23854 | 23905 | 23823 | 23809 | 119 |
| 0 | 0 | 0 | 0 | 0 | 0 | 120 |
| 0 | 0 | 0 | 0 | 0 | 0 | 121 |
| 0 | 0 | 0 | 0 | 0 | 0 | 122 |
| 0 | 0 | 0 | 0 | 0 | 0 | 123 |
| 0 | 0 | 0 | 0 | 0 | 0 | 124 |
| 0 | 0 | 0 | 0 | 0 | 0 | 125 |
| 0 | 0 | 0 | 0 | 0 | 0 | 126 |
| 0 | 0 | 0 | 0 | 0 | 0 | 127 |

TABLE 3

RECEIVED DIL U-CODE INDICIES

| DIL0 | DIL1 | DIL2 | DIL3 | DIL4 | DIL5 | INDEX |
|---|---|---|---|---|---|---|
| 0 | 0 | 0 | 0 | 0 | 0 | 0 |
| 0 | 0 | 0 | 0 | 0 | 0 | 1 |
| 0 | 0 | 0 | 0 | 0 | 0 | 2 |
| 0 | 0 | 0 | 0 | 0 | 0 | 3 |
| 0 | 0 | 0 | 0 | 0 | 0 | 4 |
| 0 | 0 | 0 | 0 | 0 | 0 | 5 |
| 0 | 0 | 0 | 0 | 0 | 0 | 6 |
| 0 | 0 | 0 | 0 | 0 | 0 | 7 |
| 0 | 0 | 0 | 0 | 0 | 0 | 8 |
| 0 | 0 | 0 | 0 | 0 | 0 | 9 |
| 0 | 0 | 0 | 0 | 0 | 0 | 10 |
| 0 | 0 | 0 | 0 | 0 | 0 | 11 |
| 0 | 0 | 0 | 0 | 0 | 0 | 12 |
| 0 | 0 | 0 | 0 | 0 | 0 | 13 |
| 0 | 0 | 0 | 0 | 0 | 0 | 14 |
| 0 | 0 | 0 | 0 | 0 | 0 | 15 |
| 7 | 7 | 7 | 7 | 7 | 7 | 16 |
| 0 | 0 | 0 | 0 | 0 | 0 | 17 |
| 0 | 0 | 0 | 0 | 0 | 0 | 18 |
| 0 | 0 | 0 | 0 | 0 | 0 | 19 |
| 10 | 10 | 10 | 10 | 10 | 10 | 20 |
| 0 | 0 | 0 | 0 | 0 | 0 | 21 |
| 0 | 0 | 0 | 0 | 0 | 0 | 22 |
| 0 | 0 | 0 | 0 | 0 | 0 | 23 |
| 13 | 13 | 13 | 13 | 13 | 13 | 24 |
| 0 | 0 | 0 | 0 | 0 | 0 | 25 |
| 0 | 0 | 0 | 0 | 0 | 0 | 26 |
| 0 | 0 | 0 | 0 | 0 | 0 | 27 |
| 16 | 16 | 16 | 16 | 16 | 16 | 28 |
| 0 | 0 | 0 | 0 | 0 | 0 | 29 |

TABLE 3-continued

RECEIVED DIL U-CODE INDICIES

| DIL0 | DIL1 | DIL2 | DIL3 | DIL4 | DIL5 | INDEX |
|---|---|---|---|---|---|---|
| 0 | 0 | 0 | 0 | 0 | 0 | 30 |
| 0 | 0 | 0 | 0 | 0 | 0 | 31 |
| 18 | 18 | 18 | 18 | 18 | 18 | 32 |
| 0 | 0 | 0 | 0 | 0 | 0 | 33 |
| 19 | 19 | 19 | 19 | 19 | 19 | 34 |
| 0 | 0 | 0 | 0 | 0 | 0 | 35 |
| 21 | 21 | 21 | 21 | 21 | 21 | 36 |
| 0 | 0 | 0 | 0 | 0 | 0 | 37 |
| 22 | 22 | 22 | 22 | 22 | 22 | 38 |
| 0 | 0 | 0 | 0 | 0 | 0 | 39 |
| 24 | 24 | 24 | 24 | 24 | 24 | 40 |
| 0 | 0 | 0 | 0 | 0 | 0 | 41 |
| 26 | 26 | 26 | 26 | 26 | 26 | 42 |
| 0 | 0 | 0 | 0 | 0 | 0 | 43 |
| 27 | 27 | 27 | 27 | 27 | 27 | 44 |
| 0 | 0 | 0 | 0 | 0 | 0 | 45 |
| 29 | 29 | 29 | 29 | 29 | 29 | 46 |
| 0 | 0 | 0 | 0 | 0 | 0 | 47 |
| 31 | 31 | 31 | 31 | 31 | 31 | 48 |
| 32 | 31 | 31 | 32 | 32 | 31 | 49 |
| 33 | 33 | 33 | 33 | 33 | 33 | 50 |
| 34 | 33 | 33 | 34 | 34 | 33 | 51 |
| 34 | 34 | 34 | 34 | 34 | 34 | 52 |
| 35 | 34 | 34 | 35 | 35 | 34 | 53 |
| 36 | 36 | 36 | 36 | 36 | 36 | 54 |
| 37 | 36 | 36 | 37 | 37 | 36 | 55 |
| 37 | 37 | 37 | 37 | 37 | 37 | 56 |
| 38 | 37 | 37 | 38 | 38 | 37 | 57 |
| 39 | 39 | 39 | 39 | 39 | 39 | 58 |
| 40 | 39 | 39 | 40 | 40 | 39 | 59 |
| 41 | 41 | 41 | 41 | 41 | 41 | 60 |
| 41 | 41 | 41 | 41 | 41 | 41 | 61 |
| 42 | 42 | 42 | 42 | 42 | 42 | 62 |
| 43 | 42 | 42 | 43 | 43 | 42 | 63 |
| 44 | 44 | 44 | 44 | 44 | 44 | 64 |
| 46 | 44 | 44 | 46 | 46 | 44 | 65 |
| 47 | 47 | 47 | 47 | 47 | 47 | 66 |
| 48 | 47 | 47 | 48 | 48 | 47 | 67 |
| 49 | 49 | 49 | 49 | 49 | 49 | 68 |
| 50 | 49 | 49 | 50 | 50 | 49 | 69 |
| 51 | 51 | 51 | 51 | 51 | 51 | 70 |
| 51 | 51 | 51 | 51 | 51 | 51 | 71 |
| 52 | 52 | 52 | 52 | 52 | 52 | 72 |
| 53 | 52 | 52 | 53 | 53 | 52 | 73 |
| 54 | 54 | 54 | 54 | 54 | 54 | 74 |
| 55 | 54 | 54 | 55 | 55 | 54 | 75 |
| 55 | 55 | 55 | 55 | 55 | 55 | 76 |
| 56 | 55 | 55 | 56 | 56 | 55 | 77 |
| 57 | 57 | 57 | 57 | 57 | 57 | 78 |
| 58 | 57 | 57 | 58 | 58 | 57 | 79 |
| 59 | 59 | 59 | 59 | 59 | 59 | 80 |
| 61 | 59 | 59 | 61 | 61 | 59 | 81 |
| 62 | 62 | 62 | 62 | 62 | 62 | 82 |
| 64 | 62 | 62 | 64 | 64 | 62 | 83 |
| 64 | 64 | 64 | 64 | 64 | 64 | 84 |
| 65 | 64 | 64 | 65 | 65 | 64 | 85 |
| 66 | 66 | 66 | 66 | 66 | 66 | 86 |
| 67 | 66 | 66 | 67 | 67 | 66 | 87 |
| 68 | 68 | 68 | 68 | 68 | 68 | 88 |
| 68 | 68 | 68 | 68 | 68 | 68 | 89 |
| 69 | 69 | 69 | 69 | 69 | 69 | 90 |
| 70 | 69 | 69 | 70 | 70 | 69 | 91 |
| 71 | 71 | 71 | 71 | 71 | 71 | 92 |
| 72 | 71 | 71 | 72 | 72 | 71 | 93 |
| 72 | 72 | 72 | 72 | 72 | 72 | 94 |
| 73 | 72 | 72 | 73 | 73 | 72 | 95 |
| 74 | 74 | 74 | 74 | 74 | 74 | 96 |
| 76 | 74 | 74 | 76 | 76 | 74 | 97 |
| 78 | 78 | 78 | 78 | 78 | 78 | 98 |
| 79 | 78 | 78 | 79 | 79 | 78 | 99 |
| 80 | 80 | 80 | 80 | 80 | 80 | 100 |
| 81 | 80 | 80 | 81 | 81 | 80 | 101 |
| 82 | 82 | 82 | 82 | 82 | 82 | 102 |
| 83 | 82 | 82 | 83 | 83 | 82 | 103 |
| 83 | 83 | 83 | 83 | 83 | 83 | 104 |
| 84 | 83 | 83 | 84 | 84 | 83 | 105 |
| 85 | 85 | 85 | 85 | 85 | 85 | 106 |
| 86 | 85 | 85 | 86 | 86 | 85 | 107 |
| 87 | 87 | 87 | 87 | 87 | 87 | 108 |
| 87 | 87 | 87 | 87 | 87 | 87 | 109 |
| 88 | 88 | 88 | 88 | 88 | 88 | 110 |
| 89 | 88 | 88 | 89 | 89 | 88 | 111 |
| 90 | 90 | 90 | 90 | 90 | 90 | 112 |
| 92 | 90 | 90 | 92 | 92 | 90 | 113 |
| 93 | 93 | 93 | 93 | 93 | 93 | 114 |
| 95 | 93 | 93 | 95 | 95 | 93 | 115 |
| 96 | 96 | 96 | 96 | 96 | 96 | 116 |
| 97 | 96 | 96 | 97 | 97 | 96 | 117 |
| 98 | 98 | 98 | 98 | 98 | 98 | 118 |
| 98 | 98 | 98 | 98 | 98 | 98 | 119 |
| 0 | 0 | 0 | 0 | 0 | 0 | 120 |
| 0 | 0 | 0 | 0 | 0 | 0 | 121 |
| 0 | 0 | 0 | 0 | 0 | 0 | 122 |
| 0 | 0 | 0 | 0 | 0 | 0 | 123 |
| 0 | 0 | 0 | 0 | 0 | 0 | 124 |
| 0 | 0 | 0 | 0 | 0 | 0 | 125 |
| 0 | 0 | 0 | 0 | 0 | 0 | 126 |
| 0 | 0 | 0 | 0 | 0 | 0 | 127 |

Although a number of embodiments of the present invention have been presented by way of example, the present invention should not be construed to be limited thereby. Rather, the present invention should be interpreted to encompass any and all variations, permutations, modifications, adaptations, embodiments and derivations which would occur to one skilled in this art, having been taught the present invention by the instant application. Accordingly, the present invention should be construed as being limited only by the following claims.

We claim:

1. A method for generating multiple unique real non-linear constellations each representing different time slots corresponding to a set of network CODEC linear output levels for each digital PCM code from the server modem, said method comprising:

receiving, in an analog modem, the linear output of a network CODEC converted from PCM coded data transmitted by a network server modem, the linear data comprising a number of data points in a predetermined number of slots, averaging, in the analog modem, the linear data, for each digital PCM code, for each of the time slots, to generate a statistical estimate of the linear data corresponding to the real non-linear constellation points to produce estimated real non-linear constellation points, converting, using a first converting algorithm, to map the estimated real non-linear constellation points to the network CODEC linear output levels, matching, in the analog modem, for selecting closest ideal CODEC output levels for a selected type of network CODEC, and converting, using an inverse of the first converting algorithm, to re-map the closest ideal CODEC output levels back to real non-linear constellation points.

2. The method of claim 1, wherein the pre-selected frame size comprises one of 6 slots, 12 slots, or 24 slots.

3. The method of claim 1, wherein the converting algorithm comprises:
    detecting digital PAD attenuation, and
    multiplying the linear values by an estimated digital PAD attenuation for mapping to CODEC output values.
4. The method of claim 1, wherein the matching algorithm comprises:
    detecting the type of the network CODEC, and
    slicing the converted linear values to ideal CODEC output values.
5. The method of claim 3, further comprising:
    detecting inter-modulation distortion, and
    applying an additional level dependent multiplication to the linear values for mapping to CODEC output if inter-modulation distortion is detected.
6. The method of claim 1, wherein averaging further comprises:
    grouping similar Robbed Bit Signaling slots, and
    averaging constellation points of the similar Robbed Bit Signaling slots, thus reducing the number of real non-linear constellations.
7. The method of claim 6, wherein averaging comprises:
    averaging only for Non-Robbed Bit Signaling slots.
8. The method of claim 4, wherein linear data output of the network CODEC is according to one of G711 A-law CODEC output levels, G711 A-law CODEC output levels, or output levels corresponding to D4 channel bank CODECs specified in AT&T Technical Reference, PUB 43801, November 1982.
9. The method of claim 1, further comprising:
    limiting the largest constellation point to a level supported by hardware before saturation.
10. The method of claim 1, further comprising:
    calculating and inserting ideal values that correspond to missing PCM codes into the constellations when low level PCM codes are not signaled due to statistical requirements and when the line noise is small enough to support such low PCM codes.
11. The method of claim 1, further comprising:
    eliminating constellation points which are non-monotonic due to presence of heavy impairments or a non-standard network CODEC.
12. The method of claim 3, wherein a failure in PAD detection in said detecting is treated as a 0 dB PAD and raw averaged data is used as the real non-linear constellation points.
13. The method of claim 4, wherein if CODEC detection fails, the raw averaged data is used as the constellation points.
14. An apparatus to generate multiple unique real non-linear constellations each representing different time slots corresponding to a set of network CODEC linear output levels for each digital PCM code from the server modem, said apparatus comprising:
    an analog modem for receiving linear output of a network CODEC converted from PCM coded data transmitted by a digital server, the linear data comprising a number of data points in a predetermined number of slots;
    averaging means, coupled to the analog modem, for averaging each of the PCM codes, for each of the time slot, to generate a statistical estimate of the linear data corresponding to the real non-linear constellation points to produce estimated real non-linear constellation points;
    first converting means, coupled to the averaging means, for mapping, using a converting algorithm, the estimated real non-linear constellation points to the network CODEC linear output levels;
    matching means, coupled to the first converting means, for selecting closest ideal CODEC outputs for network CODEC type;
    second converting means, coupled to matching means, for remapping, using an inverse of the converting algorithm, the closest ideal CODEC output levels back to real non-linear constellation points.
15. The apparatus of claim 14, wherein the pre-selected frame size is one of 6 slots, 12 slots, or 24 slots.
16. The apparatus of claim 14, wherein said first converting means comprises:
    means for detecting digital PAD attenuation; and
    means for multiplying the linear values by an estimated digital PAD attenuation for mapping to CODEC output values.
17. The apparatus of claim 14, wherein said matching means comprises:
    means for detecting the type of the Network CODEC; and
    means for slicing the converted linear values to ideal CODEC output values.
18. The apparatus of claim 16, further comprising:
    means for detecting inter-modulation distortion; and
    means for applying an additional level dependent multiplication to the linear values for mapping to CODEC output if inter-modulation distortion is detected.
19. The apparatus of claim 14, wherein said means for averaging further comprises:
    means for grouping similar Robbed Bit Signaling slots; and means for averaging constellation points of similar Robbed Bit Signaling slots, thus reducing the number of real non-linear constellations.
20. The apparatus of claim 19, wherein said means for averaging further comprises:
    means for averaging only for Non-Robbed Bit Signaling slots.
21. The apparatus of claim 17, wherein linear data output of the network CODEC is according to one of G711 A-law CODEC output levels, G711 A-law CODEC output levels, or output levels corresponding to D4 channel bank CODECs specified in AT&T 5 Technical Reference, PUB 43801, November 1982.
22. The apparatus of claim 14, further comprising:
    means for limiting the largest constellation point to a level supported by hardware before saturation.
23. The apparatus of claim 14, further comprising:
    means for calculating and inserting ideal values corresponding to missing PCM codes into the constellations, when low level PCM codes are not signaled due to statistical requirements and when line noise is small enough to support those low PCM codes.
24. The apparatus of claim 14, further comprising:
    means for eliminating constellation points that are non-monotonic due to presence of heavy impairments or a non-standard network CODEC.
25. The apparatus in claim 16, wherein a failure in PAD detection is treated as 0 dB PAD and the raw average of the linear data is used as the real non-linear constellation points.
26. The apparatus of claim 17, wherein a failure in CODEC detection results in the raw averaged data to be used as the constellation points.

* * * * *